United States Patent
Wang et al.

(10) Patent No.: US 11,000,761 B2
(45) Date of Patent: May 11, 2021

(54) VIRTUAL MOTOR VEHICLE CONTROLLING SYSTEM

(71) Applicant: AAC Technologies Pte. Ltd., Singapore (SG)

(72) Inventors: Xiuyue Wang, Shenzhen (CN); Yulei Zhang, Shenzhen (CN); Jianqi Li, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 4 days.

(21) Appl. No.: 16/530,943

(22) Filed: Aug. 2, 2019

(65) Prior Publication Data

US 2020/0047065 A1 Feb. 13, 2020

(30) Foreign Application Priority Data

Aug. 13, 2018 (CN) .......................... 201821302226.7

(51) Int. Cl.
*A63F 13/00* (2014.01)
*A63F 13/285* (2014.01)
*A63F 13/803* (2014.01)

(52) U.S. Cl.
CPC .......... *A63F 13/285* (2014.09); *A63F 13/803* (2014.09); *A63F 2300/1037* (2013.01); *A63F 2300/6063* (2013.01); *A63F 2300/8017* (2013.01)

(58) Field of Classification Search
CPC ...... A63F 13/285; A63F 13/803; A63F 13/00; A63F 13/25; A63F 13/55
See application file for complete search history.

(56) References Cited

U.S. PATENT DOCUMENTS

| | | | | |
|---|---|---|---|---|
| 2009/0082112 A1* | 3/2009 | Itskov | ................... | A63F 13/803 463/42 |
| 2012/0157198 A1* | 6/2012 | Latta | ..................... | A63F 13/803 463/31 |
| 2015/0130707 A1* | 5/2015 | Da Costa | ................ | A63F 13/60 345/156 |
| 2015/0182856 A1* | 7/2015 | Mays, III | ................ | A63F 13/26 463/31 |

OTHER PUBLICATIONS https://www.youtube.com/watch?v=5L5CMKPE0Xg How to select manual gears in Need for Speed 2015 (Year: 2016).*

* cited by examiner

*Primary Examiner* — Omkar A Deodhar
*Assistant Examiner* — Eric M Thomas
(74) *Attorney, Agent, or Firm* — W&G Law Group LLP

(57) ABSTRACT

The present disclosure discloses a virtual motor vehicle engine controlling system including a processor, a virtual motor vehicle engine, a start/stop controlling unit, a brake controlling unit, a acceleration controlling unit, a sound play controlling unit and a video play controlling unit, the virtual motor vehicle engine controlling system further including a tactile feedback unit controlled by the processor which may perform tactile feedback to the user at the virtual motor vehicle engine interface. The virtual motor vehicle engine controlling system of the present invention has a better effect of user experience compared with related technologies.

3 Claims, 2 Drawing Sheets

VIRTUAL MOTOR VEHICLE CONTROLLING SYSTEM

FIELD OF THE PRESENT DISCLOSURE

The present invention relates to virtual motor vehicle technical field, and especially relates to a virtual motor vehicle engine controlling system.

DESCRIPTION OF RELATED ART

The amount of intelligent mobile devices has been growing continuously with the advent of mobile Internet age. The attendant PC games, mobile games, mobile application softwares provided by racing car scenarios become more and more popular.

Virtual motor vehicle engine controlling system of related technology includes a processor, a virtual motor vehicle engine, a start/stop controlling unit, a brake controlling unit, a acceleration controlling unit, a sound play controlling unit and a video play controlling unit, the virtual motor vehicle engine includes a virtual motor vehicle engine interface; the start/stop controlling unit includes a start/stop virtual button and a start/stop virtual button sensor for sensing the start/stop signals of the start/stop virtual button; the brake controlling unit includes a brake virtual button and a brake virtual button sensor for sensing the brake signals of the brake virtual button; the acceleration controlling unit includes a acceleration virtual button and a acceleration virtual button sensor for sensing the acceleration information of the acceleration virtual button; the virtual motor vehicle engine interface includes a virtual gear meter, the processor communicatively connects with the start/stop virtual button sensor, the brake virtual button sensor, the acceleration virtual button sensor and respectively controls the sound play controlling unit to play sounds in the virtual motor vehicle engine interface, controls the video play controlling unit to play videos in the virtual motor vehicle engine interface and controls the gear changes of the virtual gear meter.

However, in virtual motor vehicle engine controlling systems of related technologies, user can only obtain auditory and visual experience by way of the sound play controlling unit and the video play controlling unit, while can not obtain tactile experience, user experience is poor.

Thus, it is necessary to provide a new virtual motor vehicle engine controlling system which solves the above the technical problems.

BRIEF DESCRIPTION OF THE DRAWINGS

Hereinafter, the figures required in the description of the embodiments will be briefly introduced, to describe the technical solutions in the embodiments of the present invention more clearly. It is evident that the figures described below are merely some of the embodiments of the present invention. For a person of ordinary skill in the art, other figures can be obtained according to these figures without applying inventive activity, in which figures.

DETAILED DESCRIPTION OF THE EXEMPLARY EMBODIMENT

Hereinafter, technical solutions in the embodiments of the present invention will be described clearly and completely, in conjunction with the figures in the embodiments of the present invention. It is evident that the described embodiments are merely part of the embodiments of the present invention, rather than all of the embodiments. Basing on the embodiments of the present invention, all other embodiments obtained by a person of ordinary skill in the art without applying inventive activity are all within the scope of protection of the present invention.

Figure 1:
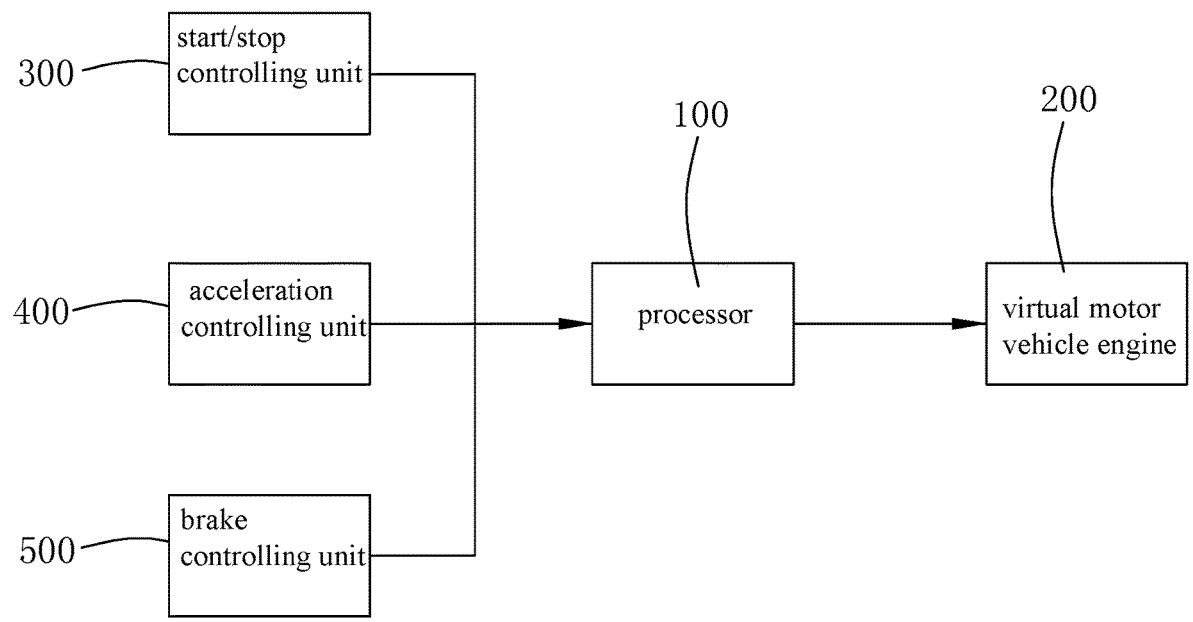
FIG. 1 is a partial structure constitution view of the virtual motor vehicle engine controlling system of the present invention.

With reference to FIG. 1, the present invention provides a virtual motor vehicle engine controlling system, which including a processor 100, a virtual motor vehicle engine 200, a start/stop controlling unit 300, a brake controlling unit 500, a acceleration controlling unit 400, sound play controlling unit (not shown), a video play controlling unit (not shown) and a tactile feedback unit (not shown).

Figure 2:
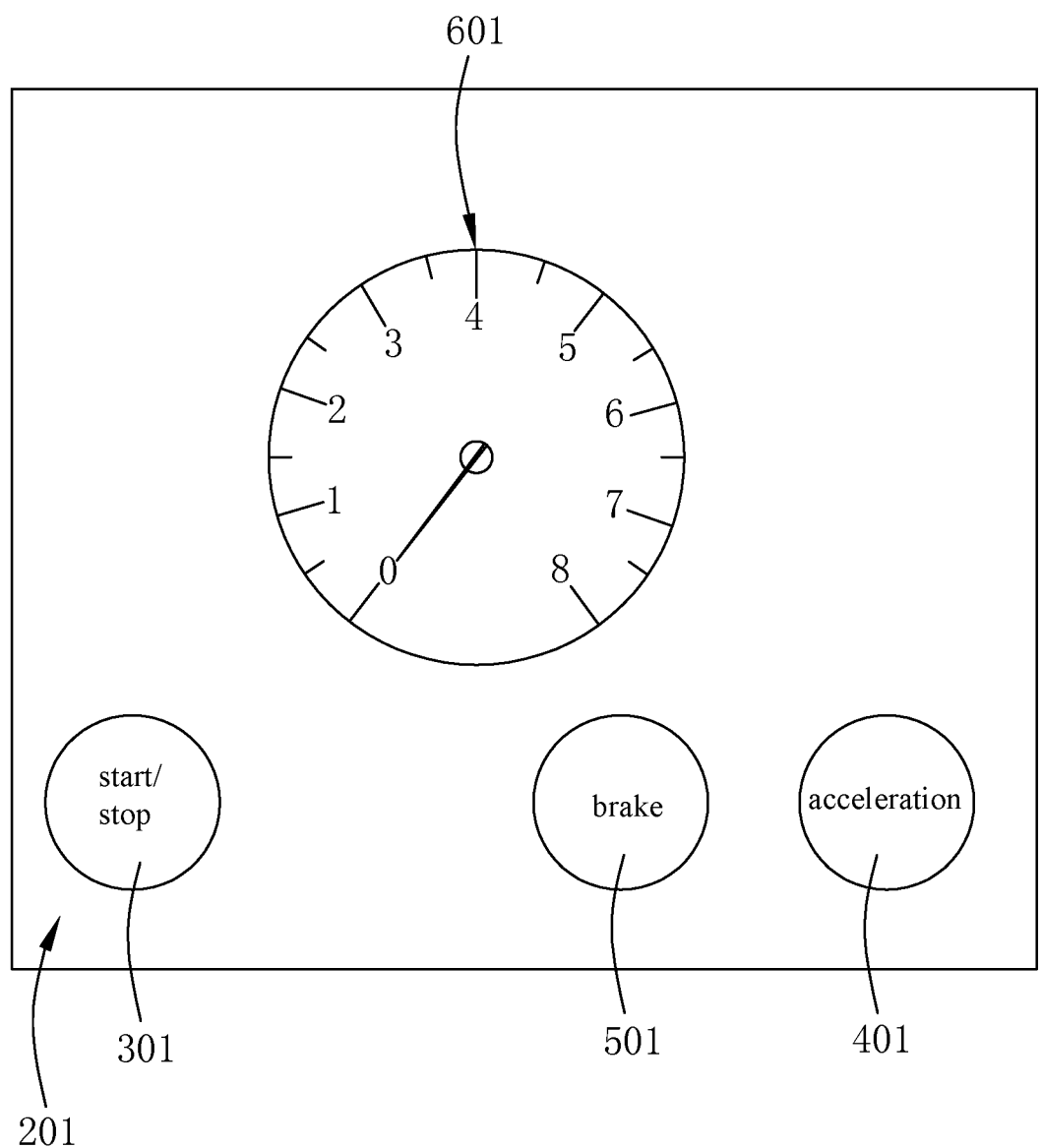
FIG. 2 is a virtual motor vehicle engine interface schematic view of the virtual motor vehicle engine controlling system of the present invention.

With reference to FIG. 2, the virtual motor vehicle engine 200 comprises a virtual motor vehicle engine interface 201, the virtual motor vehicle engine interface 201 comprises a start/stop virtual button 301, a brake virtual button 501, a acceleration virtual button 401 and a virtual gear meter 601.

The start/stop controlling unit 300 comprises a start/stop virtual button 301 provided to the virtual motor vehicle engine interface 201 and a start/stop virtual button sensor (not shown) for sensing start/stop signals of the start/stop virtual button 301.

The brake controlling unit 500 comprises a brake virtual button 501 provided to the virtual motor vehicle engine interface 201 and a brake virtual button sensor (not shown) for sensing brake signals of the brake virtual button 501.

The acceleration controlling unit 400 comprises a acceleration virtual button 401 provided to the virtual motor vehicle engine interface 201 and a acceleration virtual button sensor for sensing acceleration information of the acceleration virtual button 401.

The processor 100 is communicatively connected with the start/stop virtual button sensor, the brake virtual button sensor, and the acceleration virtual button sensor, and respectively controls the sound play controlling unit to play sounds in the virtual motor vehicle engine interface 201, controls the video play controlling unit to play videos in the virtual motor vehicle engine interface 201 and controls the gear changes of the virtual gear meter 601, also controls the tactile feedback unit to generate vibration feedback in the virtual motor vehicle engine interface 201, providing vibration feedback to the user.

In this embodiment, the virtual gear meter 601 comprises a plurality of virtual gears, the sound play controlling unit, the video play controlling unit and the tactile feedback unit are respectively provided with sounds, videos and vibration feedbacks matching with the plurality of virtual gears. Therefore, under different gears, user may obtain different user experiences for effectively improving experience comfort.

Specifically, the virtual gear meter 601 comprises 6 virtual gears which are respectively a first gear, a second gear, a third gear, a fourth gear, a fifth gear and a sixth gear, with each gear configured with different sound, video and vibration feedback. Therefore, it is more adapted to the gear design of motor vehicle. The user experience is closer to the real experience which makes user experience better.

More specifically, the virtual gear meter 601 also comprises a start/stop virtual gear. The start/stop virtual gear is configured with start sound, start video, start vibration feedback and stop sound, stop video, stop vibration feedback. Therefore, user can obtain visual, auditory and tactile experiences at both the beginning and the end of usage, which makes user experience better.

The virtual motor vehicle engine start: the start/stop virtual button 301 of the virtual motor vehicle engine interface 201 is clicked, the start/stop virtual button sensor senses and sends start signal to the processor 100. The processor 100 starts the virtual motor vehicle engine 200 and controls the sound play controlling unit, the video play controlling unit to play the corresponding start sound, and the tactile feedback unit to provide start vibration feedback. After the virtual motor vehicle engine starts, the stop operation can be performed by click the start/stop virtual button 301 again.

After the virtual motor vehicle engine starts, the virtual motor vehicle engine enters an idle speed state, a pointer of the virtual gear meter 601 points to the first gear. The processor controls the sound play controlling unit, the video play controlling unit to play the corresponding first gear sound, and the tactile feedback unit to provide first gear vibration feedback.

The virtual motor vehicle engine acceleration: in the idle speed state, acceleration virtual button 401 is pressed, the acceleration virtual button sensor senses and feedbacks the detected a press duration signal to the processor 100. The processor 100 compares the press duration with the predetermined upshift duration. The press duration reaching the predetermined upshift duration triggers the upshift condition, and continuous press causes continuous upshift. The processor 100 controls the sound play controlling unit, video play controlling unit to play the corresponding gear sound and the tactile feedback unit to provide the corresponding gear vibration feedback.

The virtual motor vehicle engine deceleration: when the acceleration virtual button 401 is no longer pressed, the virtual motor vehicle engine no longer accelerate and enters the process of natural deceleration, the gear also downshifts level by level, while accompanied by different videos, sounds and vibration effects, until downshifts to the first gear which is the idle speed gear.

The virtual motor vehicle engine brake: under non-acceleration state, the brake virtual button 501 is pressed, the brake virtual button sensor senses and sends signal to the processor 100. The processor 100 controls the gear of the virtual motor vehicle engine 200 to downshift to the first gear which is idle speed gear. the brake condition is triggered while braking, sounds and videos are played and the vibration effect is feed backed.

The virtual motor vehicle engine stop: when it is in the idle speed state, the start/stop virtual button 301 may be clicked to perform stop operation, the start/stop virtual button sensor senses and sends stop signal to the processor 100. The processor 100 stops the virtual motor vehicle engine 200, and at the same time controls the sound play controlling unit, the video play controlling unit to play the corresponding stop sound, and the tactile feedback unit to provide stop vibration feedback.

Compared to the prior art, the virtual motor vehicle engine controlling system provided by the present invention provides the corresponding vibration feedback through the tactile feedback unit when the virtual motor vehicle engine is in start, acceleration, deceleration, brake, stop states, and the like, providing user with visual, auditory and tactile comprehensive experiences in conjunction with the corresponding sound and video provided by the sound play controlling unit and the video play controlling unit.

However, that mentioned above is merely an embodiment of the present invention, and not so limiting the patentable scope of the present invention. Equivalent structures or equivalent process transformations, or direct or indirect application in other related fields made using the specification and the drawings of the present invention, are therefore all contained in the scope of patent protection of the present invention for the same reason.

What is claimed is:

1. A virtual motor vehicle engine controlling system, comprising a processor, a virtual motor vehicle engine, a start/stop controlling unit, a brake controlling unit, a acceleration controlling unit, a sound play controlling unit and a video play controlling unit, wherein the virtual motor vehicle engine comprises a virtual motor vehicle engine interface; the start/stop controlling unit comprises a start/stop virtual button and a start/stop virtual button sensor for sensing start/stop signals of the start/stop virtual button; the brake controlling unit comprises a brake virtual button and a brake virtual button sensor for sensing brake signals of the brake virtual button; the acceleration controlling unit comprises a acceleration virtual button and a acceleration virtual button sensor for sensing acceleration information of the acceleration virtual button; the virtual motor vehicle engine interface comprises a virtual gear meter, wherein the processor communicatively connects with the start/stop virtual button sensor, the brake virtual button sensor, the acceleration virtual button sensor and respectively control the sound play controlling unit to play sounds in the virtual motor vehicle engine interface, wherein the processor is used to controls the video play controlling unit to play videos in the virtual motor vehicle engine interface and controls the gear changes of the virtual gear meter, and wherein the virtual motor vehicle engine controlling system further includes a tactile feedback unit, the tactile feedback unit electrically connecting with the processor, the processor controlling the tactile feedback unit to generate vibration feedback in the virtual motor vehicle engine interface, wherein the virtual gear meter comprises a plurality of virtual gears, the sound play controlling unit, the video play controlling unit and the tactile feedback unit are respectively provided with sounds, videos and vibration feedbacks matching with the plurality of virtual gears.

2. The virtual motor vehicle engine controlling system as described in claim 1, wherein the virtual gear meter comprises 6 virtual gears which are respectively a first gear, a second gear, a third gear, a fourth gear, a fifth gear and a sixth gear, with each gear configured with different sound, video and vibration feedback.

3. The virtual motor vehicle engine controlling system as described in claim 1, wherein the virtual gear meter also comprises a start/stop virtual gear configured with start sound, start video, start vibration feedback, stop sound, stop video, and stop vibration feedback.

\* \* \* \* \*